US012706252B2

(12) United States Patent
Kashihara et al.

(10) Patent No.: US 12,706,252 B2
(45) Date of Patent: Aug. 11, 2026

(54) SOLID ELECTROLYTIC CAPACITOR

(71) Applicant: Panasonic Intellectual Property Management Co., Ltd., Osaka (JP)

(72) Inventors: Masanori Kashihara, Saga (JP); Tsuyoshi Kusakabe, Fukuoka (JP); Rie Shimooka, Osaka (JP); Masayuki Sato, Saga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/290,786

(22) PCT Filed: Jul. 12, 2022

(86) PCT No.: PCT/JP2022/027346
§ 371 (c)(1),
(2) Date: Jan. 21, 2024

(87) PCT Pub. No.: WO2023/008174
PCT Pub. Date: Feb. 2, 2023

(65) Prior Publication Data

US 2024/0242894 A1 Jul. 18, 2024

(30) Foreign Application Priority Data

Jul. 29, 2021 (JP) ................................ 2021-124385
Aug. 31, 2021 (JP) ................................ 2021-141480

(51) Int. Cl.
*H01G 9/08* (2006.01)
*H01G 9/012* (2006.01)
*H01G 9/15* (2006.01)

(52) U.S. Cl.
CPC .............. *H01G 9/08* (2013.01); *H01G 9/012* (2013.01); *H01G 9/15* (2013.01)

(58) Field of Classification Search
CPC ............ H01G 9/15; H01G 9/012; H01G 9/08
See application file for complete search history.

(56) References Cited

U.S. PATENT DOCUMENTS 11,915,886 B2 * 2/2024 Nagai ...................... H01G 9/08
2004/0113242 A1 * 6/2004 Kato ...................... H01L 24/01
257/666

(Continued)

FOREIGN PATENT DOCUMENTS

JP H04348512 A * 12/1992
JP 05-021290 1/1993

(Continued)

OTHER PUBLICATIONS

International Search Report of PCT application No. PCT/JP2022/027346 dated Oct. 11, 2022.

*Primary Examiner* — David M Sinclair
(74) *Attorney, Agent, or Firm* — WHDA, LLP

(57) ABSTRACT

A solid electrolytic capacitor includes a capacitor element, an anode lead frame, a cathode lead frame, and an exterior body. The anode lead frame includes a first buried part that is a part of the anode lead frame and is buried in the exterior body. The cathode lead frame includes a second buried part that is a part of the cathode lead frame and is buried in the exterior body. A plurality of recesses are formed on a surface of at least one of the first buried part or the second buried part. The plurality of recesses include a plurality of first recesses formed on a surface of the first buried part. The solid electrolytic capacitor further includes an insulating film disposed to cover at least one selected from the group consisting of at least a part of the anode part and at least one of the plurality of first recesses.

20 Claims, 4 Drawing Sheets

(56) References Cited

U.S. PATENT DOCUMENTS

| | | | | |
|---|---|---|---|---|
| 2005/0057889 | A1* | 3/2005 | Kato ...................... | H01G 9/042 361/523 |
| 2010/0246100 | A1* | 9/2010 | Umemoto ................ | H01G 9/15 361/535 |
| 2015/0213961 | A1* | 7/2015 | Liu ........................ | H01G 9/012 29/25.03 |
| 2015/0357122 | A1 | 12/2015 | Matsubara et al. | |
| 2016/0189872 | A1 | 6/2016 | Naito et al. | |
| 2019/0214199 | A1 | 7/2019 | Ueda et al. | |
| 2019/0287732 | A1* | 9/2019 | Nagayama ............... | H01G 9/15 |

FOREIGN PATENT DOCUMENTS

| | | | | | |
|---|---|---|---|---|---|
| JP | 2001057321 | A | * | 2/2001 | ........... H01G 9/0003 |
| JP | 2008-135460 | A | | 6/2008 | |
| JP | 2008-277331 | A | | 11/2008 | |
| JP | 2013-171986 | | | 9/2013 | |
| JP | 2015-167182 | | | 9/2015 | |
| JP | 2015-230976 | A | | 12/2015 | |
| JP | 2016-122689 | | | 7/2016 | |
| WO | 2018/061535 | | | 4/2018 | |

* cited by examiner

SOLID ELECTROLYTIC CAPACITOR

TECHNICAL FIELD

The present disclosure relates to a solid electrolytic capacitor.

BACKGROUND

Solid electrolytic capacitors are mounted on various electronic devices. A capacitor element, which is a main part of a solid electrolytic capacitor, includes an anode part, a dielectric layer, and a cathode part. The capacitor element deteriorates in characteristics by coming into contact with oxygen and moisture. In particular, the solid electrolyte layers greatly deteriorate due to the influence of oxygen and moisture.

The periphery of the capacitor element is covered with an exterior body including resin. However, even when the capacitor element is covered with the exterior body, oxygen and moisture enter through various paths, and the electrolyte layer deteriorates. Measures for preventing such deterioration have been conventionally proposed.

Unexamined Japanese Patent Publication No. H05-021290 discloses "A solid electrolytic capacitor including: an anodic oxidation film formed on a plate or foil made of a valve metal as a dielectric material; a dielectric polymer layer and a dielectric layer sequentially formed on a predetermined portion of the dielectric material to constitute a capacitor element; a lead frame serving as a lead-out terminal connected to a valve metal part and a conductor layer part of the capacitor element; and a mold resin externally covering a part of the capacitor element and the lead frame, wherein a solder alloy layer or a tin metal layer having a copper metal layer as a base is formed on a surface of the lead frame other than a portion in contact with the mold resin, only a copper metal layer is formed on the portion of the lead frame in contact with the mold resin, and a surface of the copper metal layer is roughened".

Unexamined Japanese Patent Publication No. 2013-171986 discloses "A solid electrolytic capacitor including: a capacitor element including an anode body in which an anode wire is buried, a dielectric material film provided on a surface of the anode body, and a solid electrolyte provided on a surface of the dielectric material film and containing a conductive polymer; an exterior body covering the capacitor element; an anode lead frame electrically connected to the anode wire, extending from an inside to an outside of the exterior body, and functioning as an anode terminal; and a cathode lead frame electrically connected to the solid electrolyte layer, extending from the inside to the outside of the exterior body, and functioning as a cathode terminal, wherein a solder plating layer is provided on a surface of the cathode lead frame, and the solder plating layer has a divided part in a region including a first boundary part that is a boundary between the inside and the outside of the exterior body on the cathode lead frame side".

SUMMARY

A first aspect of the present disclosure relates to a solid electrolytic capacitor. The solid electrolytic capacitor includes a capacitor element including an anode part and a cathode part, an anode lead frame electrically connected to the anode part, a cathode lead frame electrically connected to the cathode part, and an exterior body that covers the capacitor element. The anode lead frame includes a first buried part that is a part of the anode lead frame and is buried in the exterior body. The cathode lead frame includes a second buried part that is a part of the cathode lead frame and is buried in the exterior body. A plurality of recesses are formed on a surface of at least one of the first buried part or the second buried part. The plurality of recesses include a plurality of first recesses formed on a surface of the first buried part. The solid electrolytic capacitor further includes an insulating film disposed to cover at least one selected from the group consisting of at least a part of the anode part and at least one of the plurality of first recesses.

According to the present disclosure, a solid electrolytic capacitor with high reliability is obtained.

DESCRIPTION OF EMBODIMENT

Figure 1:
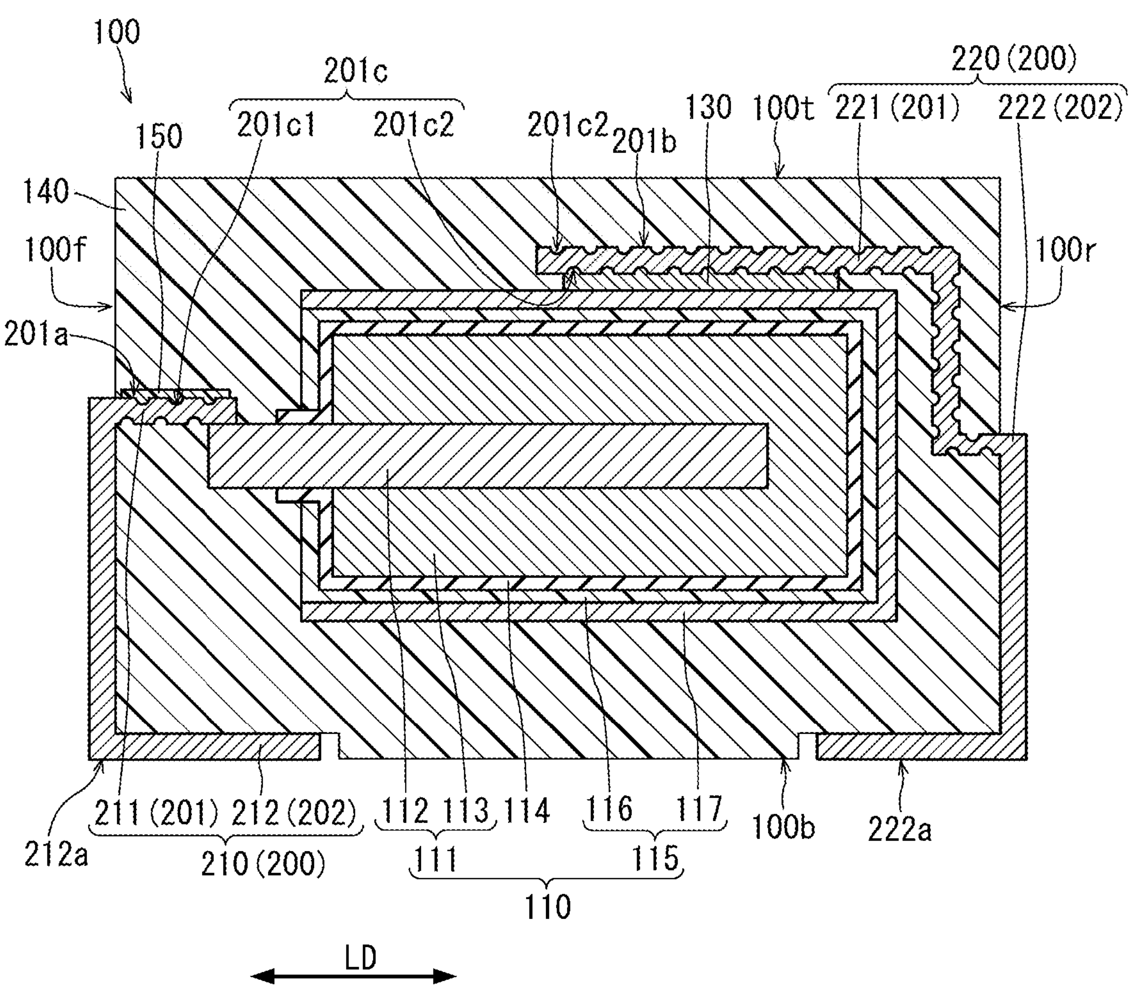
FIG. 1 is a sectional view schematically illustrating a solid electrolytic capacitor of a first exemplary embodiment.

Currently, further improvements in reliability (for example, performance stability) of solid electrolytic capacitors are required. In view of the above problems, one of objects of the present disclosure is to provide a solid electrolytic capacitor with high reliability.

Hereinafter, exemplary embodiments of a solid electrolytic capacitor according to the present disclosure will be described with reference to examples, but the present disclosure is not limited to the examples to be described below. Although specific numerical values and materials may be provided as examples in the description below, other numerical values and materials may be applied as long as the effects of the present disclosure can be obtained. In this specification, the description "numerical value A to numerical value B" includes a numerical value A and a numerical value B, and can be read as "between numerical value A and numerical value B (inclusive)". In the following description, in a case where lower limits and upper limits of numerical values related to specific physical properties, conditions, or the like are illustrated, any of the illustrated lower limits and any of the illustrated upper limits can be freely combined unless the lower limit is equal to or more than the upper limit. Hereinafter, the solid electrolytic capacitor may be referred to as an electrolytic capacitor or a capacitor. Hereinafter, the anode lead frame and the cathode lead frame may be collectively referred to as lead frames, and the first buried part and the second buried part may be collectively referred to as a buried part.

(Solid Electrolytic Capacitor)

A solid electrolytic capacitor according to the present exemplary embodiment includes a capacitor element including an anode part and a cathode part, an anode lead frame electrically connected to the anode part, a cathode lead frame electrically connected to the cathode part, and an exterior body covering the capacitor element. The anode lead frame includes a first buried part that is a part of the anode lead frame and is buried in the exterior body, and the cathode lead frame includes a second buried part that is a part of the cathode lead frame and is buried in the exterior body. A plurality of recesses are formed on a surface of the buried part (first buried part, second buried part). The plurality of recesses include a plurality of first recesses formed on a surface of the first buried part. Hereinafter, the recesses and the first recesses may be referred to as "recesses (C)" and "first recesses (C1)", respectively. The solid electrolytic capacitor further includes an insulating film disposed to cover at least one selected from the group consisting of at least a part of the anode part and at least one of the plurality of first recesses (C1). Hereinafter, the insulating film may be referred to as "insulating film (F)".

In this specification, when insulating film (F) is formed so as to cover recesses (C) (first recesses (C1) and second recesses (C2) to be described later), the surface around recesses (C) is usually covered with insulating film (F). Thus, the description "insulating film (F) covers recesses (C) formed on a surface of the buried part" may be usually read as "insulating film (F) covers the surface of the region where recesses (C) are formed in a surface of the buried part".

Oxygen and the like (oxygen, moisture, and the like) easily reach the electrolyte layer through the interface between the buried part and the exterior body. In the capacitor of the present exemplary embodiment, a plurality of recesses (C) are formed on a surface of the buried part. This causes a penetration path of oxygen and the like through the interface between the buried part and the exterior body to be long, and thus oxygen and the like hardly reach the electrolyte layer. In addition, the surface area is increased to enhance the anchor effect of the buried part by the plurality of recesses (C), and thus the adhesion between the buried part and the exterior body or the like is improved. These can prevent deterioration of the electrolyte layer due to entry of oxygen and the like. As a result, deterioration of the capacitor element can be prevented, and a solid electrolytic capacitor with high reliability can be obtained.

In the electrolytic capacitor, migration from the anode lead frame may be a problem. Specifically, metal eluted from the anode lead frame or the anode part may precipitate on other parts such as the cathode part, leading to a short circuit. The migration is more likely to occur when the surface area of the anode lead frame is increased.

The electrolytic capacitor of the present exemplary embodiment includes insulating film (F) described above. Use of insulating film (F) can suppress entry of oxygen and the like from the anode part and migration from the anode lead frame and the like.

In the electrolytic capacitor according to an example of the present exemplary embodiment, insulating film (F) does not include an insulating filler, and the exterior body includes an insulating filler.

Insulating film (F) may contain an insulating filler or may contain no insulating filler. The exterior body usually contains an insulating filler. Each of the exterior body and insulating film (F) may contain an insulating filler. The insulating filler contained in the exterior body and the insulating filler contained in insulating film (F) may be referred to as "first insulating filler" and "second insulating filler", respectively. That is, the exterior body may contain the first insulating filler, and insulating film (F) may contain the second insulating filler. Content R2 (mass %) of the second insulating filler in insulating film (F) is preferably smaller than content R1 (mass %) of the first insulating filler in the exterior body. This configuration can enhance the adhesion of insulating film (F). Content R2 may be less than 50 mass %, less than 30 mass %, less than or equal to 20 mass %, or less than or equal to 10 mass %, or may be more than or equal to 0.1 mass %, more than or equal to 1 mass %, or more than or equal to 10 mass %.

From the viewpoint of enhancing the flame retardancy and the strength, content R1 is preferably in a range from 30 mass % to 95 mass %, inclusive (for example, in a range from 50 mass % to 90 mass %, inclusive).

The average particle size of the second insulating filler may be smaller than the average particle size of the first insulating filler. This configuration can enhance the adhesion of insulating film (F).

The average particle size of the insulating filler (first and second insulating fillers) is a median diameter (D50) at which a cumulative volume is 50% in a volume-based particle size distribution. The median diameter is determined using a laser diffraction/scattering type particle size distribution measuring apparatus.

Examples of the insulating filler (first and second insulating fillers) include insulating particles and insulating fibers. Examples of the insulating material forming the insulating filler include insulating compounds (e.g., oxides) such as silica and alumina, glass, and mineral materials (e.g., talc, mica, or clay). The insulating filler contained in the exterior body may be one kind or two or more kinds. The first insulating filler and the second insulating filler may be the same or different. Using the insulating fillers (first and second insulating fillers) can enhance the flame retardancy and strength of the film containing them.

Insulating film (F) may contain a resin (insulating resin). Examples of the resin (insulating resin) include epoxy resin, silicone resin, fluororesin, phenol resin, urea resin, polyimide, polyamide-imide, polyurethane, diallyl phthalate, unsaturated polyester, polyphenylene sulfide (PPS), and polybutylene terephthalate (PBT). Insulating film (F) may contain at least one resin selected from the group consisting of epoxy resin, silicone resin, urethane resin, polyester resin, amino resin, acrylic resin, vinyl resin, phenol resin, and fluororesin. These resins are preferable in terms of high flexibility.

The thickness of insulating film (F) is not particularly limited and may be in a range from 1 μm to 200 μm, inclusive (for example, in a range from 5 μm to 100 μm, inclusive).

Insulating film (F) may be continuously formed so as to cover at least a part of the plurality of first recesses (C1) and a boundary part between the anode part and the cathode part. This configuration can particularly suppress entry of oxygen and the like from the anode part and migration of the anode lead frame from the first buried part.

The plurality of recesses (C) may include a plurality of second recesses formed on a surface of the second buried part of the cathode lead frame. Hereinafter, the second recesses may be referred to as "second recesses (C2)". Forming recesses (C) in the first buried part and the second buried part makes it possible to particularly suppress entry of oxygen and the like.

The lead frame may include a base material and a plating layer formed on the base material. In such a case, the plurality of first recesses (C1) may be formed to penetrate the plating layer so that the base material is exposed from the plating layer. In such a case, at least one of the plurality of first recesses (C1) is preferably covered with the insulating film. When recesses (C1) are formed to reach the base material, the base material (for example, a base material containing copper) is exposed at the portions of recesses (C1). In such a case, migration of a metal (for example, copper) in the base material is particularly likely to occur. Covering recesses (C1) with insulating film (F) can particularly suppress the migration. From the viewpoint of preventing a short circuit or the like due to migration, it is particularly preferable to cover a first recess (C1) located at a position close to the cathode part among the plurality of first recesses (C1).

The surface of the first buried part among the surfaces of the buried part may be hereinafter referred to as "first surface", and the surface of the second buried part among the surfaces of the buried part may be hereinafter referred to as "second surface". The plurality of recesses (C) are formed at least on the first surface of the first buried part. The plurality of recesses (C) may be formed on both the first surface and the second surface.

Average diameter D1 of the opening with respect to each of the plurality of recesses (C) may be more than or equal to 5 μm, more than or equal to 10 μm, or more than or equal to 30 μm, and may be less than or equal to 200 μm, less than or equal to 100 μm, or less than or equal to 75 μm. Average diameter D1 may be in a range from 5 μm to 200 μm, inclusive (for example, in a range from 10 μm to 100 μm, inclusive).

An equivalent circle diameter can be used as the diameter of the opening of each recess. The equivalent circle diameter is obtained by the following method. First, the opening of the recess is photographed from above view. Next, the obtained image is subjected to image processing to obtain the area of the opening. Next, the equivalent circle diameter is calculated from the obtained area. Average diameter D1 is obtained by calculating the diameter (equivalent circle diameter) of the opening for each of any selected 20 recesses and arithmetically averaging the obtained diameters.

The depth of each of the plurality of recesses (C) may be more than or equal to 0.5 μm, more than or equal to 2 μm, or more than or equal to 10 μm, and may be less than or equal to 100 μm, less than or equal to 50 μm, or less than or equal to 30 μm. For example, the depth of recess (C) may be from 2 μm to 50 μm, inclusive. The depth of each of the plurality of recesses (C) is preferably larger than the average thickness of the plating layer. The depth of recess (C) can be changed by the output power of laser light to be emitted to form recesses (C).

Recesses (C) can be formed by irradiating the lead frame with laser light (for example, pulsed laser light). As compared with the case of roughening the surface by sandblasting, etching, or the like, the case of forming recesses (C) by irradiation with laser light has the following advantages. Firstly, since variations in the shape and size of recesses (C) can be reduced, adhesion (airtightness) between the lead frame and the exterior body can be stably secured. Secondly, since the size of recesses (C) can be controlled according to the size of the insulating filler in the exterior body and the size of the conductive particles in the electrically conductive adhesive layer, the adhesion (airtightness) can be further enhanced. Thirdly, since the size, shape, and arrangement pattern of recesses (C) can be changed depending on the position, the adhesion (airtightness) can be further enhanced.

Forming recesses (C) with laser light makes it possible to form the recesses having a uniform size and shape at desired positions. For example, the diameter of the opening of each recess (C) can be controlled to be in a range from 50% to 150%, inclusive, of average diameter D1.

The plurality of recesses (C) may have similar shapes and sizes to each other. Alternatively, the plurality of recesses (C) may include recesses (C) having different sizes or shapes from each other. The plurality of recesses (C) may include a recess (C) having a circular opening, may include a recess (C) having a non-circular opening, or may include both. Examples of recess (C) having a non-circular opening include a recess obtained by forming a plurality of recesses each having a circular opening in such a manner that they partially overlap each other. Examples of the non-circular shape include a shape in which only a small portion of two adjacent circles overlap and a shape in which most of two adjacent circles overlap. Examples of the non-circular shape also include the shape of a locus when the circle is shifted. Examples of the non-circular shape include an elliptical shape, an elongated round shape, an oval shape, and a substantially triangular shape. The plurality of recesses (C) may include a recess (C) having a groove shape.

The plurality of recesses (C) may be formed in the entire lead frame. Alternatively, the plurality of recesses (C) may be formed only on the surface of the buried part without being formed on the exposed part exposed from the exterior body. The plurality of recesses (C) may be formed only in a part of the buried part. The proportion (Sc/Sa) of area Sc occupied by the opening of recess (C) in apparent area Sa of the surface of the buried part may be more than or equal to 5%, more than or equal to 10%, more than or equal to 20%, more than or equal to 30%, and may be less than or equal to 90%, less than or equal to 80%, less than or equal to 70%, less than or equal to 60%, 50%, less than or equal to 40%, less than or equal to 30%, or less than or equal to 20%. In this specification, the apparent area of the surface is the area of the surface when it is assumed that the surface is a flat surface without unevenness such as recesses (C), and can be calculated from the outer shape of the target portion. For example, the apparent area of the surface of the buried part can be calculated from the outer shape of the buried part.

The proportion (Sc1/Sa1) of area Sc1 occupied by the openings of recesses (C1) formed in the first buried part in apparent area Sa1 of the surface of the first buried part may fall within the range exemplified for the proportion (Sc/Sa). The proportion (Sc2/Sa2) of area Sc2 occupied by the openings of recesses (C2) formed in the second buried part in apparent area Sa2 of the surface of the second buried part may fall within the range exemplified for the proportion (Sc/Sa). The proportion (Sc/Sa), the proportion (Sc1/Sa1), and the proportion (Sc2/Sa2) may be the same or different.

The proportion of recesses (C) in the surface of the buried part may be changed depending on the position. For example, the proportion with respect to the surface in contact with the exterior body may be changed to be different from the proportion with respect to the surface in contact with the electrically conductive adhesive layer. For example, the proportion of recesses (C) in the surface of the former surface may be higher than the proportion of recesses (C) in the surface of the latter surface. In an example, the interval between the plurality of recesses (C) in the former surface is made narrower than the interval between the plurality of recesses (C) in the latter surface.

(Example of Configuration of Solid Electrolytic Capacitor)

Examples of the configuration and constituent elements of the solid electrolytic capacitor according to the present exemplary embodiment will be described below. The configuration and constituent elements of the solid electrolytic capacitor according to the present exemplary embodiment are not limited to the following examples. An example of the solid electrolytic capacitor according to the present exemplary embodiment includes a capacitor element, an anode lead frame, a cathode lead frame, and an exterior body. These will be described below.

(Capacitor Element)

The capacitor element includes an anode part, a dielectric layer, and a cathode part. The capacitor element is not particularly limited, and a capacitor element used in a known solid electrolytic capacitor may be used. The method for forming the capacitor element is not limited, and the capacitor element may be formed by a known method.

The anode part may be formed of an anode body or may include an anode body and an anode wire. The anode body may be a porous sintered body or a metal foil having a porous surface. The dielectric layer is formed on a surface of the anode body. The cathode part includes an electrolyte layer (solid electrolyte layer) and a cathode layer. The electrolyte layer is disposed between the cathode layer and the dielectric layer formed on the surface of the anode body. These constituent elements are not particularly limited, and constituent elements used for known solid electrolytic capacitors may be applied. Examples of these constituent elements will be described below.

(Anode Body)

The anode body may be formed by sintering material particles. Examples of the material particles include particles of a valve metal, particles of an alloy containing a valve metal, and particles of a compound containing a valve metal. One of these kinds of particles may be used alone, or two or more of these kinds may be used in mixture. Alternatively, a foil of a valve metal may be used as the anode body. Examples of the valve metal include titanium (Ti), tantalum (Ta), niobium (Nb), and aluminum (Al). A preferred example of the anode body as a sintered body is a sintered body of tantalum. A preferred example of the anode body as a metal foil is an aluminum foil.

The dielectric layer formed on the surface of the anode body is not particularly limited, and it may be formed by a known method. For example, the dielectric layer may be formed by anodizing the surface of the anode body.

(Anode Wire)

As the anode wire, a wire made of metal can be used. Examples of the material of the anode wire include the above-described valve metals, copper, and aluminum alloy. The anode wire is partially buried in the anode body, and the remaining part protrudes from an end surface of the anode body.

(Electrolyte Layer)

The electrolyte layer (solid electrolyte layer) is not particularly limited, and a solid electrolyte layer used in a known solid electrolytic capacitor may be applied. The electrolyte layer is disposed to cover at least a part of the dielectric layer. The electrolyte layer may be formed using a manganese compound or a conductive polymer. Examples of the conductive polymer include polypyrrole, polythiophene, polyaniline, and derivatives of these. These polymers may be used alone or in combination of a plurality of polymers. In addition, the conductive polymer may be a copolymer of two or more kinds of monomers. The derivative of the conductive polymer means a polymer having the conductive polymer as a basic skeleton. For example, examples of the derivative of polythiophene include poly(3,4-ethylenedioxythiophene).

A dopant is preferably added to the conductive polymer. The dopant can be selected according to the conductive polymer, and a known dopant (for example, a polymer dopant) may be used. Examples of the dopant include naphthalenesulfonic acid, p-toluenesulfonic acid, polystyrenesulfonic acid, and salts of these. An example of the electrolyte layer is formed using poly(3,4-ethylenedioxythiophene) (PEDOT) doped with polystyrenesulfonic acid (PSS).

The electrolyte layer containing the conductive polymer may be formed by polymerizing a monomer as a raw material on the dielectric layer. Alternatively, the electrolyte layer may be formed by disposing a liquid containing the conductive polymer (and a dopant as necessary) to the dielectric layer and then drying the liquid.

(Cathode Layer)

The cathode layer is a layer having conductivity and is disposed to cover at least a part of the electrolyte layer. The cathode layer includes a cathode lead-out layer having conductivity. The cathode layer may include another conductive layer (for example, a carbon layer) disposed between the electrolyte layer and the cathode lead-out layer. For example, the cathode layer may include a carbon layer formed on the electrolyte layer and a cathode lead-out layer formed on the carbon layer. The cathode lead-out layer may be formed of a metal paste (for example, a silver paste) containing metal particles (for example, silver particles) and a resin, or may be formed of a known silver paste. The carbon layer is a layer containing carbon, and it may be formed of a conductive carbon material such as graphite and a resin.

(Anode Lead Frame and Cathode Lead Frame)

The lead frames (the anode lead frame and the cathode lead frame) include a base material. The base material is made of metal (copper, copper alloy, and the like). The thickness of the base material is not particularly limited and may be in a range from 25 μm to 200 μm, inclusive (for example, in a range from 25 μm to 100 μm, inclusive). The lead frames may include a base material and a plating layer formed on the base material.

The plating layer is formed of a metal (including an alloy) such as nickel, gold, palladium, tin, or copper, and may include a nickel layer, a gold layer, a palladium layer, a tin layer, a copper layer, or the like. For example, the plating layer may be stacked on the base material in the order of a nickel layer, a gold layer, and a palladium layer. The plating layer can be formed by a known plating method.

The average thickness of the plating layer may be more than or equal to 0.1 μm, or more than or equal to 0.5 μm, and may be less than or equal to 50 μm, or less than or equal to 10 μm. For example, the average thickness of the plating layer may be from 0.1 μm to 10 μm, inclusive.

The average thickness of the plating layer is determined, for example, by measuring thicknesses at any 10 points from a photograph of a section and arithmetically averaging the measured thicknesses. The thicknesses at any 10 points may be measured using an X-ray fluorescence spectrometer.

When the plating layer is formed on the surface of the base material, a plurality of recesses may be formed on the base material by irradiating the base material with laser light, and then the plating layer may be formed on the surface of the base material. Since the plating layer is thin, a portion of the recess formed on the base material becomes the recess (C). Alternatively, a plurality of recesses (C) may be formed after a plating layer is formed on the surface of the base material. In the latter case, the recesses (C) may be formed in such a manner that the base material is exposed from the plating layer.

As described above, the recesses (C) are formed in the lead frames. The anode lead frame is electrically connected to the anode part. The anode lead frame includes a first buried part buried in the exterior body and an exposed part exposed from the exterior body. The first buried part and the anode part may be connected by welding or the like. At least a part of the exposed part functions as a terminal part. The terminal part is a part where soldering or the like is performed.

The cathode lead frame is electrically connected to the cathode part. The cathode lead frame includes a second buried part buried in the exterior body and an exposed part exposed from the exterior body. The second buried part and the cathode part may be connected by an electrically conductive adhesive layer. At least a part of the exposed part functions as a terminal part. The terminal part is a part where soldering or the like is performed.

(Electrically Conductive Adhesive Layer)

The electrically conductive adhesive layer connecting the second buried part of the cathode lead frame and the cathode part contains conductive particles. Examples of the conductive particles include metal particles (for example, silver particles). The electrically conductive adhesive layer can be formed using a metal paste (for example, a silver paste) containing metal particles and a resin.

(Exterior Body)

The exterior body is arranged around the capacitor element so that the capacitor element is not exposed from the surface of the electrolytic capacitor. Further, the exterior body is disposed to cover the first buried part of the anode lead frame and the second buried part of the cathode lead frame. The exterior body usually contains a resin (insulating resin) and an insulating filler.

The exterior body can be formed of a resin composition containing an insulating resin and an insulating filler (for example, an inorganic filler). The resin composition may contain a curing agent, a polymerization initiator, a catalyst, and the like in addition to the insulating resin and the insulating filler. Examples of the insulating resin include insulating thermosetting resin and insulating thermoplastic resin. Specific examples of the insulating resin include epoxy resin, silicone resin, fluororesin, phenol resin, urea resin, polyimide, polyamide-imide, polyurethane, diallyl phthalate, unsaturated polyester, polyphenylene sulfide (PPS), and polybutylene terephthalate (PBT).

The insulating resin contained in insulating film (F) and the insulating resin contained in the exterior body may be the same or different. When insulating film (F) and the exterior body contain the same insulating resin, adhesion between insulating film (F) and the exterior body improves.

Examples of the insulating filler include insulating particles and insulating fibers. Examples of the insulating material constituting the insulating filler include the materials described above. The insulating filler contained in the exterior body may be one kind or two or more kinds.

(Method for Producing Solid Electrolytic Capacitor)

A production method of the present exemplary embodiment for producing a solid electrolytic capacitor will be described below with reference to examples. Hereinafter, the production method may be referred to as "production method (M)". According to production method (M), the solid electrolytic capacitor of the present exemplary embodiment can be produced. However, the solid electrolytic capacitor of the present exemplary embodiment may be produced by a method other than production method (M) described below. The matters described for the solid electrolytic capacitor of the present exemplary embodiment can be applied to the following production method (M), and thus redundant description may be omitted. In addition, the matters described in the following production method (M) may be applied to the solid electrolytic capacitor according to the present exemplary embodiment.

Production method (M) is a method for producing a solid electrolytic capacitor including a capacitor element including an anode part and a cathode part, an anode lead frame electrically connected to the anode part, and a cathode lead frame electrically connected to the cathode part. The anode lead frame includes a first buried part that is a part of the anode lead frame, and the cathode lead frame includes a second buried part that is a part of the cathode lead frame. Production method (M) includes step (i), step (ii), and step (iii) in this order, and further includes step (X). Step (X) is performed before step (iii), for example after step (i) or after step (ii) and before step (iii). These steps will be described below.

Step (i) includes a step of forming a plurality of recesses (C1) on a surface of the buried part (at least the first buried part) by irradiating the buried part (at least the first buried part) with laser light a plurality of times. Step (i) may include step (i-a) and step (i-b) described below in this order.

Step (i-a) is a step of preparing a lead frame including a base material and a plating layer formed on the base material. The plating layer is formed on at least a surface of a terminal part and a surface of the buried part in the surface of the base material. Usually, the plating layer is formed on the entire surface of the base material. Step (i-a) may be performed by plating a base material (for example, a metal sheet including a portion to be a lead frame) to be a lead frame. The method for forming the plating layer is not limited, and the plating layer may be formed by a known method.

Step (i-b) is a step of irradiating the plating layer of the buried part (at least the first buried part) with laser light a plurality of times to form a plurality of recesses (C) in such a manner that the plating layer remains on the surface between the plurality of recesses (C). In step (i-b), at least the first buried part is irradiated with laser light a plurality of times to form a plurality of first recesses (C1). The plurality of second recesses (C2) can also be formed in the second buried part by the same method.

In step (i-b), it is preferable to form the plurality of recesses (C) in such a manner that the base material is exposed at the bottom in each of the plurality of recesses. That is, step (i-b) may be a step of forming a plurality of recesses (C) in such a manner that the base material is exposed from the plating layer by irradiating the plating layer on the buried part with laser light a plurality of times. The plating layer is present on the surface of the buried part where the recess (C) is to be formed. Thus, when recess (C) is formed, at least a part of the plating layer at the portion of recess (C) is removed, and the plating layer other than the portion of recess (C) remains without being removed. When recess (C) is formed to reach the base material, the plating layer at the portion of recess (C) is removed, while the plating layer remains on the surface between the plurality of recesses (C).

The plurality of recesses (C) may all be formed under the same condition (for example, the same laser light). Alternatively, some of the plurality of recesses (C) may be formed under different conditions (for example, different laser light). In such a case, the recesses formed under different conditions may have different sizes or different shapes. A plurality of recesses may be formed on the surfaces of the buried part and the exposed part by irradiating not only the buried part but also the exposed part with laser light.

Recess (C) can be formed using a known laser processing device capable of forming a recess in metal. The laser light to be emitted is not particularly limited as long as recess (C) can be formed. The wavelength of the laser light may be less than or equal to 1100 nm, less than or equal to 700 nm (for example, less than or equal to 600 nm), or more than or equal to 300 nm (for example, more than or equal to 350 nm). Using laser light having a short wavelength makes it possible to prevent a temperature rise of the lead frames when recess (C) is formed. Preventing a temperature rise of the lead frames makes it possible to prevent deterioration (for example, oxidation) of the surfaces of the lead frames. The wavelength of the laser light may be 1064 nm (near infrared laser), 532 nm (visible light laser), or 355 nm (ultraviolet laser). The plurality of recesses (C) may be recesses formed by irradiation with laser light having a wavelength of from 300 nm to 1100 nm, inclusive (for example, from 300 nm to 600 nm, inclusive).

The plurality of recesses (C) may be formed by scanning laser light. Alternatively, the formation may be performed by moving a laser processing machine or the lead frames.

The laser light may be pulse laser light or continuous wave laser light (CW laser light). The recess having a circular opening may be formed by irradiation with pulsed laser light. The recess having a non-circular opening may be formed by irradiating pulsed laser light a plurality of times in such a manner that a part of the irradiation parts overlaps. Alternatively, the recess having a non-circular opening may be formed by irradiation with CW laser light (continuous wave laser light).

A preferred example of the laser light for forming recess (C) is laser light having a wavelength of 355 nm. The light source of the laser light having a wavelength of 355 nm is not particularly limited, and a third harmonic such as a $YVO_4$ laser may be used.

In an example of steps (i-a) and (i-b), first, a metal sheet including portions to be a plurality of lead frames and provided with a plating layer is prepared. Next, a portion of the metal sheet where recess (C) is to be formed is irradiated with laser light to form recess (C). Before the formation of the plating layer or after the formation of the plating layer and before or after the irradiation of laser light, an unnecessary portion of the metal sheet is removed by known metal processing. After the irradiation of laser light, a portion of the lead frames that needs to be bent is bent by known metal processing. The metal sheet thus processed is used in the next step (ii).

Step (ii) is a step of electrically connecting the first buried part to the anode part of the capacitor element and electrically connecting the second buried part to the cathode part of the capacitor element. These connection methods are not particularly limited, and known connection methods may be used. For example, the first buried part may be connected to the anode part by welding. In step (ii), the second buried part may be electrically connected to the cathode part via an electrically conductive adhesive layer containing conductive particles. Specifically, the cathode part and the second buried part may be connected using a metal paste. When recess (C) is formed on the surface of the second buried part that is in contact with the electrically conductive adhesive layer, the electrically conductive adhesive layer enters recess (C).

Step (X) is performed before step (iii). Step (X) is a step of forming insulating film (F) at a predetermined position. Specifically, insulating film (F) is formed so as to cover at least one selected from the group consisting of at least a part of the anode part and at least one of the plurality of first recesses (C1). Of course, in addition to these portions, insulating film (F) may be formed at other portions.

When insulating film (F) is formed on the surface of the buried part (at least the first buried part), step (X) is performed after step (i) and before step (iii). In such a case, insulating film (F) enters recess (C) covered with insulating film (F). When insulating film (F) is formed on the surface of the capacitor element, step (X) is performed before step (iii). Step (X) may be performed a plurality of times depending on a place where insulating film (F) is formed.

Insulating film (F) may be formed by applying a resin composition to be insulating film (F) to a portion where insulating film (F) is to be formed, and drying or curing the resin composition. The coating method is not particularly limited, and a known method can be used. For example, application may be performed by a method such as a spray method, a roll method, an air method using a dispenser, a mechanical method, or a jet method.

Step (iii) is a step of covering the buried part, insulating film (F), and the capacitor element with an exterior body. Step (iii) can be performed by a known method. Specifically, step (iii) can be performed by covering the buried part, insulating film (F), and the capacitor element with a resin composition to be an exterior body, and then curing the resin composition. At this time, the exterior body enters the inside of recess (C) that is not covered with insulating film (F). As the exterior body, an exterior body containing a resin (insulating resin) and an insulating filler can be used. The solid electrolytic capacitor can be thus produced.

Hereinafter, an example of the solid electrolytic capacitor according to the present disclosure will be specifically described with reference to the drawings. The above-described constituent elements can be applied to the constituent elements of the capacitor of the example described below. The capacitor of the example described below can be changed based on the above description. A matter described below may be applied to the exemplary embodiment described above. In the exemplary embodiments to be described below, constituent elements that are not essential to the solid electrolytic capacitor according to the present disclosure may be omitted.

FIG. 1 schematically illustrates a sectional view of solid electrolytic capacitor 100 (hereinafter, may be referred to as "electrolytic capacitor 100") of a first exemplary embodiment. In the first embodiment, an example in which the anode part includes an anode body and an anode wire will be described.

Electrolytic capacitor 100 includes capacitor element 110, lead frame 200, electrically conductive adhesive layer 130, exterior body 140, and insulating film (insulating film (F)) 150. Lead frame 200 includes anode lead frame 210 and cathode lead frame 220.

Capacitor element 110 includes anode part 111, dielectric layer 114, and cathode part 115. Anode part 111 includes anode body 113 and anode wire 112. Anode body 113 is a porous sintered body having a rectangular-parallelepiped shape, and dielectric layer 114 is formed on a surface of the anode body.

A part of anode wire 112 protrudes from one end surface of anode body 113 toward front surface **100*f* of electrolytic capacitor 100. The other part of anode wire 112 is embedded in anode body 113. Anode wire 112 extends along longitudinal direction LD of anode body 113. Cathode part 115 includes electrolyte layer 116 disposed to cover at least a part of dielectric layer 114, and cathode layer 117 formed to cover at least a part of electrolyte layer 116**.

Anode lead frame 210 includes first buried part 211 buried in exterior body 140 and exposed part 212 exposed from exterior body 140. Exposed part 212 includes terminal part **212*a* that functions as a terminal on the anode side. The surface where terminal part 212*a* is present may be referred to as bottom surface 100***b* of electrolytic capacitor 100. The surface facing bottom surface 100*b* may be referred to as upper surface 100*t* of electrolytic capacitor 100. The surface facing front surface 100*f* may be referred to as rear surface 100*r* of electrolytic capacitor 100.

Cathode lead frame 220 includes second buried part 221 buried in exterior body 140 and exposed part 222 exposed from exterior body 140. Exposed part 222 includes terminal part 222*a* that functions as a terminal on the cathode side. Hereinafter, first buried part 211 and second buried part 221 may be collectively referred to as buried part 201, and exposed part 212 and exposed part 222 may be collectively referred to as exposed part 202. Lead frame 200 includes buried part 201 and exposed part 202.

The overall shape and arrangement of lead frame 200 and the connection positions between lead frame 200 and anode part 111 and cathode part 115 are not limited to the example illustrated in FIG. 1. For example, cathode lead frame 220 may be connected to cathode part 115 at a portion other than upper surface 100*t* (for example, a portion on bottom surface 100*b* side or a portion on rear surface 100*r* side).

Buried part 201 has first surface 201*a* that is a surface of first buried part 211. Further, buried part 201 has second surface 201*b* that is a surface of second buried part 221. A part of second surface 201*b* is electrically connected to cathode part 115 (more specifically, cathode layer 117) by electrically conductive adhesive layer 130.

A plurality of recesses are formed on a surface of the buried part of the solid electrolytic capacitor according to the present exemplary embodiment at intervals. In the first exemplary embodiment, an example in which a plurality of recesses 201*c* are formed on both first surface 201*a* and second surface 201*b* will be described. Recesses 201*c* include first recess 201*c*1 formed on first surface 201*a* of first buried part 211 and second recess 201*c*2 formed on second surface 201*b* of second buried part 221.

Figure 2A:
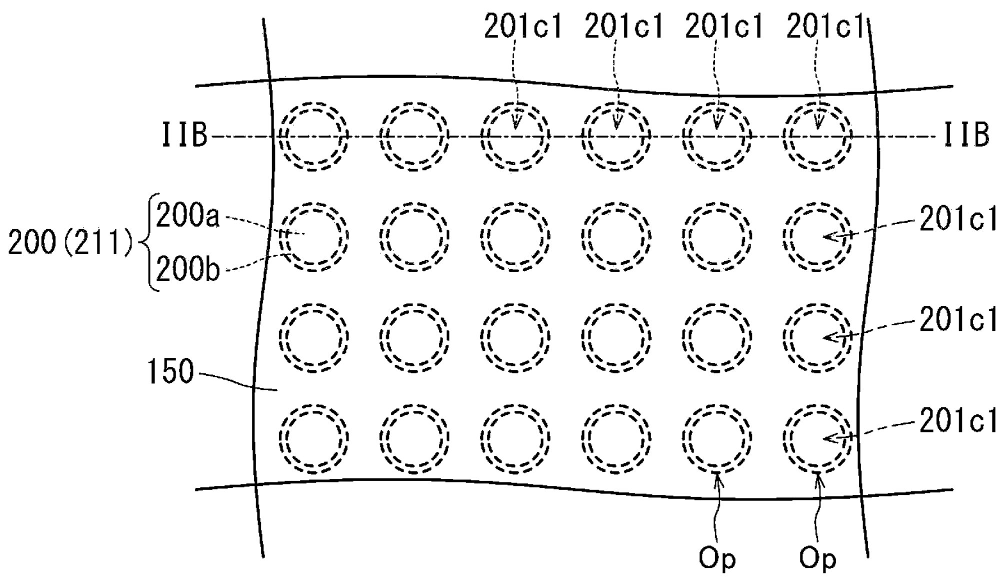
FIG. 2A is a top view schematically illustrating an example of a first buried part and an insulating film in the first exemplary embodiment.
Figure 2B:
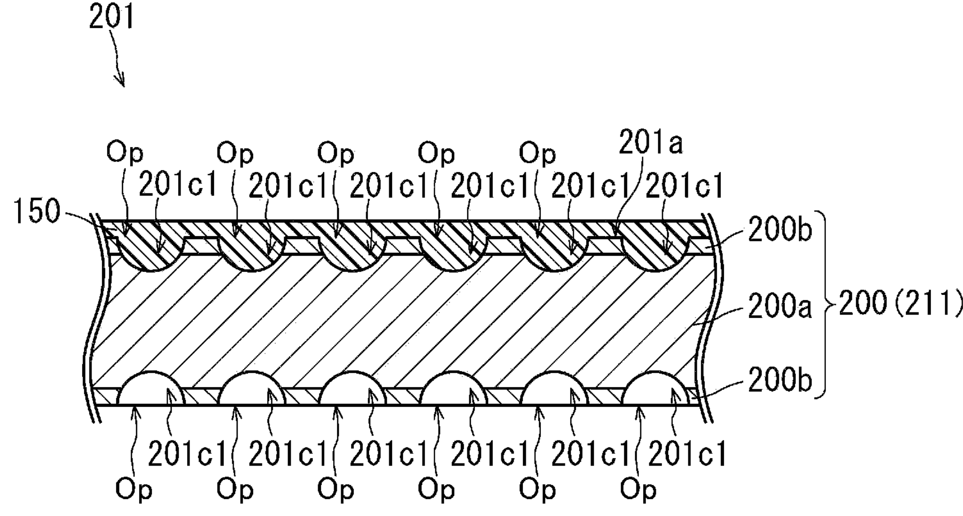
FIG. 2B is a view schematically illustrating a section taken along line IIB-IIB in FIG. 2A.

An example of arrangement of recess 201*c*1 and insulating film (F) in first buried part 211 is illustrated in FIGS. 2A and 2B. First buried part 211 is a buried part of anode lead frame 210 of lead frame 200. FIG. 2A is a view of buried part 211 as viewed from upper surface 100*t* side. A section at line IIB-IIB in FIG. 2A is illustrated in FIG. 2B. In the example illustrated in FIG. 2A, the plurality of first recesses 201*c*1 are disposed in a matrix at regular intervals. In the example illustrated in FIGS. 2A and 2B, the arrangement of first recess 201*cl* on one surface of buried part 211 is the same as the arrangement of first recess 201*c*1 on the other surface. However, the arrangement of the plurality of recesses 201*c* (recess 201*c*1 and recess 201*c*2) is not limited to the arrangement illustrated in FIGS. 2A and 2B and may be another arrangement. In FIG. 2B, the sectional shape of first recess 201*c*1 is schematically a hemispherical shape, but the sectional shape of recess 201*c* does not have to be a hemispherical shape. In the example illustrated in FIGS. 2A and 2B, the shape of opening Op of first recess 201*c*1 is a circular shape.

Lead frame 200 includes base material 200*a* and plating layer 200*b* formed to cover base material 200*a*. Plating layer 200*b* is formed on a surface of buried part 201 and a surface of exposed part 202 (surfaces of terminal part 212*a* and terminal part 222*a*). In solid electrolytic capacitor 100 according to the first exemplary embodiment, the plating layer formed on the surface of buried part 201 and the plating layer formed on the surface of exposed part 202 are connected without being divided.

First recess 201*c*1 is formed to penetrate plating layer 200*b*. In other words, base material 200*a* is exposed at the bottom of first recess 201*c*1. Plating layer 200*b* remains in a region between the plurality of first recesses 201*c*1. Insulating film 150 is formed to cover first recess 201*c*1. Insulating film (F) that has entered first recess 201*c*1 is in close contact with both base material 200*a* and plating layer 200*b*. Thus, adhesion between base material 200*a* and plating layer 200*b* can be enhanced by insulating film 150. Although FIG. 2B illustrates an example in which insulating film 150 is formed only on one surface of first buried part 211, insulating film 150 may be formed on both surfaces of first buried part 211.

Figure 3:
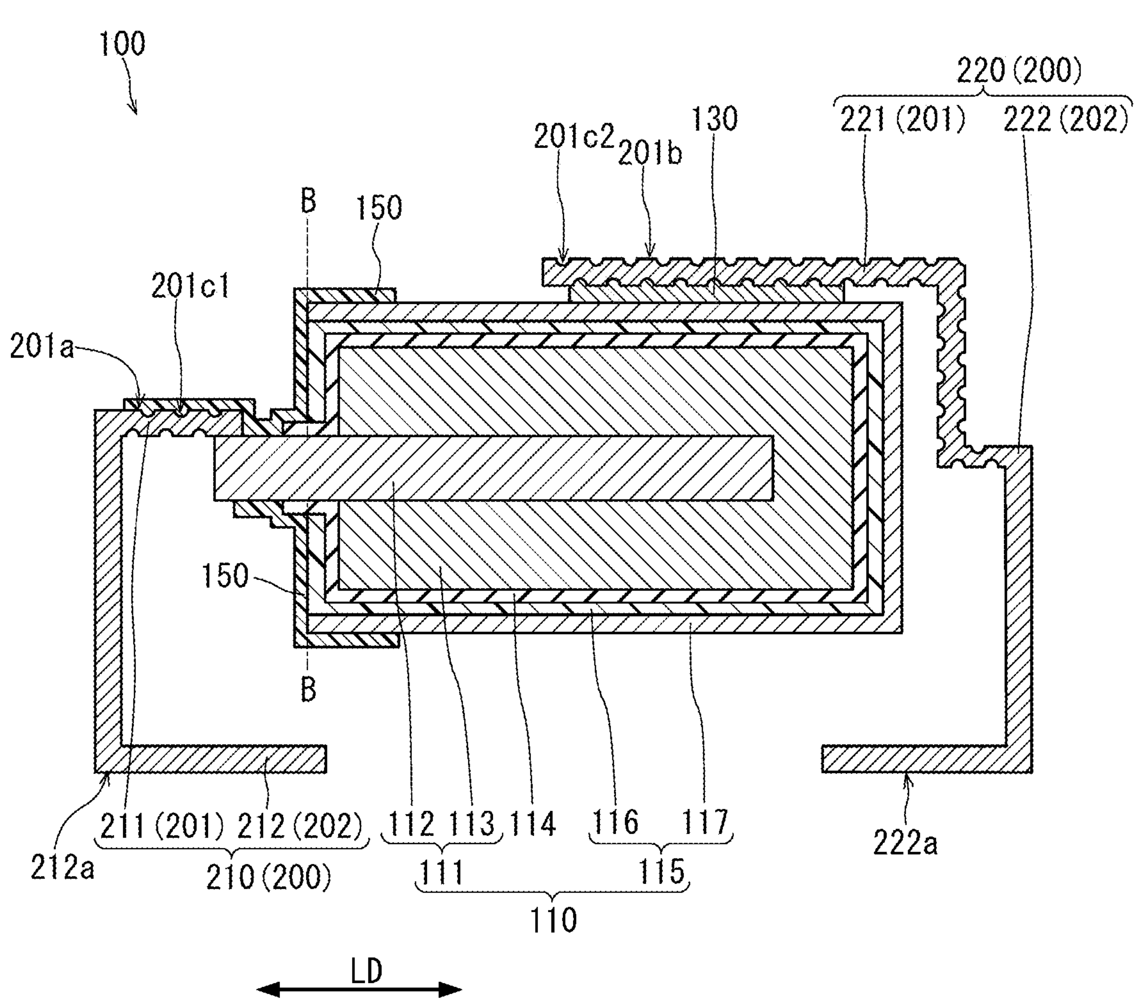
FIG. 3 is a sectional view schematically illustrating a part of a solid electrolytic capacitor of a second exemplary embodiment.

Insulating film 150 may be formed not only in the places illustrated in FIGS. 1, 2A, and 2B but also in other places. For example, in FIG. 1, insulating film 150 may be formed to cover at least a part of a surface of anode part 111 in contact with exterior body 140. Such a second exemplary embodiment is illustrated in FIG. 3. To make the drawing easily viewable, the illustration of exterior body 140 is omitted in FIG. 3.

In the second exemplary embodiment illustrated in FIG. 3, insulating film 150 also covers a part of the surface of capacitor element 110. Specifically, insulating film 150 covers a part of the region where first recess 201*c*1 is formed, a part of anode part 111 of capacitor element 110 exposed to the surface of capacitor element 110, and a part of cathode part 115 exposed to the surface of capacitor element 110. Insulating film 150 is continuously formed so as to cover at least one of the plurality of first recesses 201*c*1 and boundary part B between anode part 111 and cathode part 115. In the example illustrated in FIG. 3, insulating film 150 is formed to cover at least a part of cathode layer 117. One surface of insulating film 150 is in contact with the surface of first buried part 211 or the surface of capacitor element 110, and the other surface is in contact with exterior body 140.

Figure 4:
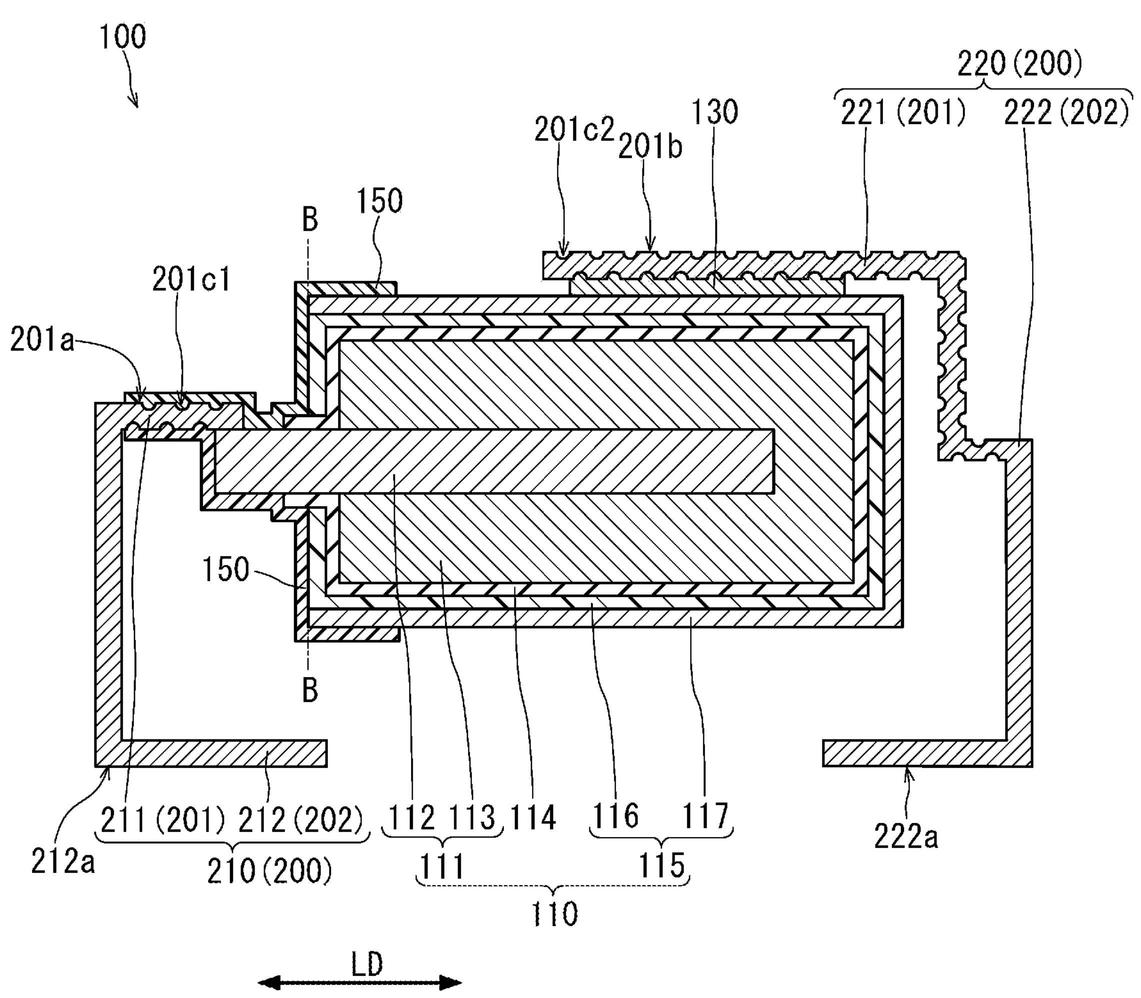
FIG. 4 is a sectional view schematically illustrating a part of a solid electrolytic capacitor of a third exemplary embodiment.

As in the third exemplary embodiment illustrated in FIG. 4, insulating film 150 may be formed so as to cover the whole or substantially the whole of the surface of first buried part 211 in addition to the portion illustrated in FIG. 3.

Insulating film 150 may be formed only on the surface of capacitor element 110 without being formed on the surface of first buried part 211.

The present disclosure can be used for a solid electrolytic capacitor.

The invention claimed is:

1. A solid electrolytic capacitor comprising:

a capacitor element including an anode part and a cathode part;

an anode lead frame electrically connected to the anode part;

a cathode lead frame electrically connected to the cathode part; and an exterior body that covers the capacitor element, wherein:

the anode lead frame includes a first buried part that is a part of the anode lead frame, the first buried part being buried in the exterior body, the cathode lead frame includes a second buried part that is a part of the cathode lead frame, the second buried part being buried in the exterior body, a plurality of recesses are formed on a surface of at least one of the first buried part or the second buried part, the plurality of recesses include a plurality of first recesses formed on a surface of the first buried part, the plurality of first recesses includes two or more first recesses aligned along a direction perpendicular to a direction extending from a portion of the anode lead frame connecting the anode part to a portion of the anode lead frame exposing to an outside of the exterior body, the two or more first recesses are separated from each other, and the solid electrolytic capacitor further comprises an insulating film disposed to cover at least one selected from the group consisting of at least a part of the anode part and at least one of the plurality of first recesses.

2. The solid electrolytic capacitor according to claim 1, wherein:

the insulating film does not contain an insulating filler, and the exterior body contains an insulating filler.

3. The solid electrolytic capacitor according to claim 1, wherein:

the exterior body includes a first insulating filler, the insulating film includes a second insulating filler, and a content (mass %) of the second insulating filler in the insulating film is less than a content (mass %) of the first insulating filler in the exterior body.

4. The solid electrolytic capacitor according to claim 1, wherein:

the exterior body includes a first insulating filler, the insulating film includes a second insulating filler, and an average particle size of the second insulating filler is smaller than an average particle size of the first insulating filler.

5. The solid electrolytic capacitor according to claim 1, wherein the insulating film includes at least one resin selected from the group consisting of epoxy resin, silicone resin, urethane resin, polyester resin, amino resin, acrylic resin, vinyl resin, phenol resin, and fluororesin.

6. The solid electrolytic capacitor according to claim 1, wherein the insulating film is continuously formed to cover the at least one of the plurality of first recesses and a boundary between the anode part and the cathode part.

7. The solid electrolytic capacitor according to claim 1, wherein the plurality of recesses further include a plurality of second recesses formed on a surface of the second buried part.

8. The solid electrolytic capacitor according to claim 1, wherein the plurality of recesses are recesses formed by irradiation with laser light.

9. The solid electrolytic capacitor according to claim 1, wherein:

the anode lead frame includes a base material and a plating layer formed on the base material, the plurality of first recesses are formed to penetrate the plating layer so that the base material is exposed from the plating layer, and the at least one of the plurality of first recesses is covered with the insulating film.

10. A solid electrolytic capacitor comprising:

a capacitor element including an anode part and a cathode part;

an anode lead frame electrically connected to the anode part;

a cathode lead frame electrically connected to the cathode part; and an exterior body that covers the capacitor element, wherein:

the anode lead frame includes a first buried part that is a part of the anode lead frame, the first buried part being buried in the exterior body, the cathode lead frame includes a second buried part that is a part of the cathode lead frame, the second buried part being buried in the exterior body, a plurality of recesses are formed on a surface of at least one of the first buried part or the second buried part, the plurality of recesses include a plurality of first recesses formed on a surface of the first buried part, the solid electrolytic capacitor further comprises an insulating film disposed to cover at least one selected from the group consisting of at least a part of the anode part and at least one of the plurality of first recesses, the anode lead frame includes a base material and a plating layer formed on the base material, the plurality of first recesses are formed to penetrate the plating layer so that the base material is exposed from the plating layer, the insulating film is in contact with both the plating layer and the base material exposed from the plating layer in each of the plurality of first recesses, the exterior body includes a first insulating filler, the insulating film includes a second insulating filler, and a content (mass %) of the second insulating filler in the insulating film is less than a content (mass %) of the first insulating filler in the exterior body.

11. The solid electrolytic capacitor according to claim 10, wherein an average particle size of the second insulating filler is smaller than an average particle size of the first insulating filler.

12. The solid electrolytic capacitor according to claim 10, wherein the insulating film includes at least one resin selected from the group consisting of epoxy resin, silicone resin, urethane resin, polyester resin, amino resin, acrylic resin, vinyl resin, phenol resin, and fluororesin.

13. The solid electrolytic capacitor according to claim 10, wherein the insulating film is continuously formed to cover the at least one of the plurality of first recesses and a boundary between the anode part and the cathode part.

14. The solid electrolytic capacitor according to claim 10, wherein the plurality of recesses further include a plurality of second recesses formed on a surface of the second buried part.

15. The solid electrolytic capacitor according to claim 10, wherein the plurality of recesses are recesses formed by irradiation with laser light.

16. A solid electrolytic capacitor comprising:

a capacitor element including an anode part and a cathode part;

an anode lead frame electrically connected to the anode part;

a cathode lead frame electrically connected to the cathode part; and an exterior body that covers the capacitor element, wherein:

the anode lead frame includes a first buried part that is a part of the anode lead frame, the first buried part being buried in the exterior body, the cathode lead frame includes a second buried part that is a part of the cathode lead frame, the second buried part being buried in the exterior body, a plurality of recesses are formed on a surface of at least one of the first buried part or the second buried part, the plurality of recesses include a plurality of first recesses formed on a surface of the first buried part, the solid electrolytic capacitor further comprises an insulating film disposed to cover at least one selected from the group consisting of at least a part of the anode part and at least one of the plurality of first recesses, the anode lead frame includes a base material and a plating layer formed on the base material, the plurality of first recesses are formed to penetrate the plating layer so that the base material is exposed from the plating layer, the insulating film is in contact with both the plating layer and the base material exposed from the plating layer in each of the plurality of first recesses, the exterior body includes a first insulating filler, the insulating film includes a second insulating filler, and an average particle size of the second insulating filler is smaller than an average particle size of the first insulating filler.

17. The solid electrolytic capacitor according to claim 16, wherein the insulating film includes at least one resin selected from the group consisting of epoxy resin, silicone resin, urethane resin, polyester resin, amino resin, acrylic resin, vinyl resin, phenol resin, and fluororesin.

18. The solid electrolytic capacitor according to claim 16, wherein the insulating film is continuously formed to cover the at least one of the plurality of first recesses and a boundary between the anode part and the cathode part.

19. The solid electrolytic capacitor according to claim 16, wherein the plurality of recesses further include a plurality of second recesses formed on a surface of the second buried part.

20. The solid electrolytic capacitor according to claim 16, wherein the plurality of recesses are recesses formed by irradiation with laser light.

* * * * *